United States Patent Office 3,589,872
Patented June 29, 1971

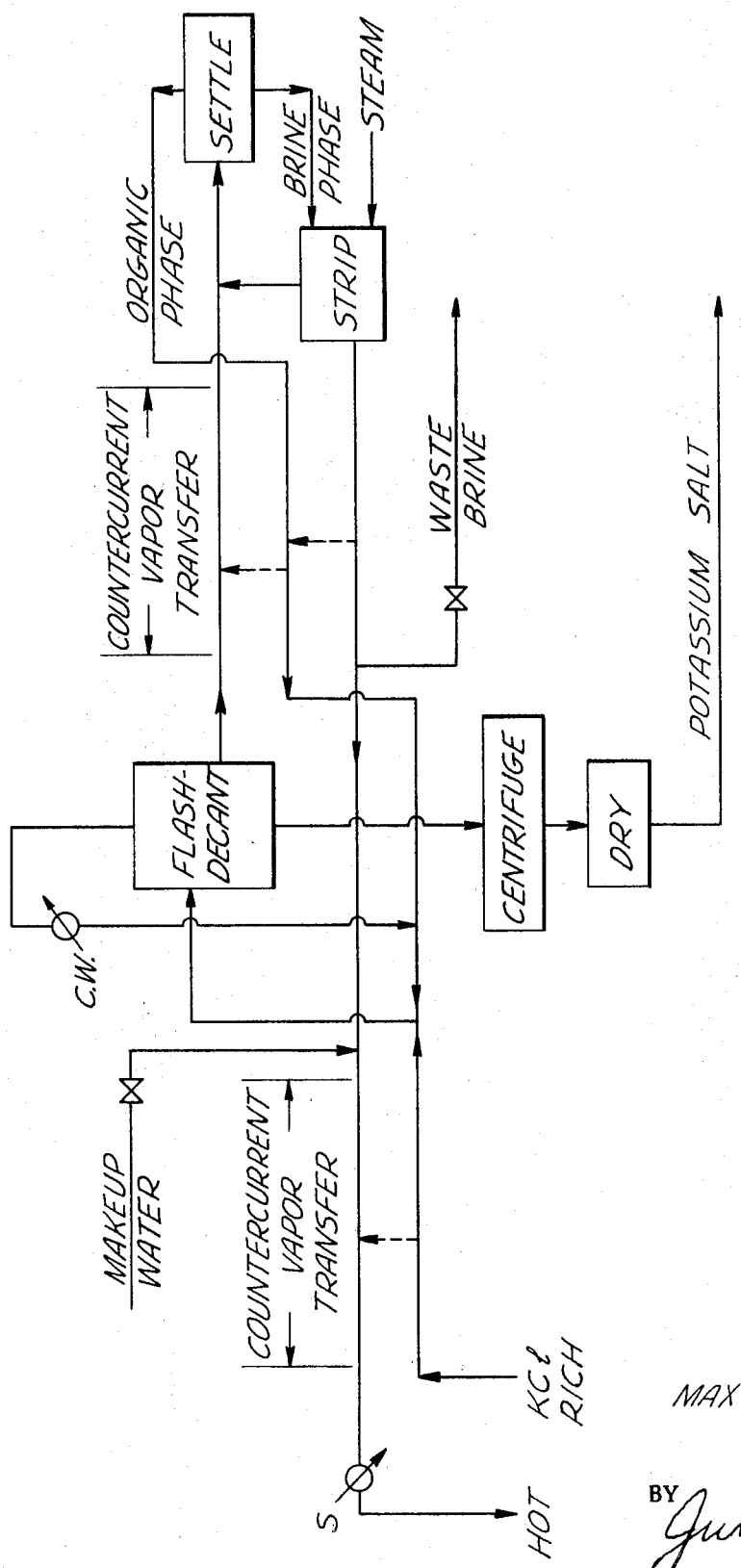

3,589,872
PRECIPITATING KCl FROM AN AQUEOUS SOLUTION WITH NaCl BY ADDING PYRIDINE AND N-METHYL-MORPHALINE
Maxwell Patrick Sweeney, 1715 Silverwood Terrace, Los Angeles, Calif. 90026
Filed July 10, 1967, Ser. No. 652,238
Int. Cl. B01d 9/02; C01d 3/04, 3/08
U.S. Cl. 23—300
2 Claims

ABSTRACT OF THE DISCLOSURE

A process for recovering an inorganic solid from an aqueous solution by adding a water miscible organic liquid which involves adding the organic solvent, separating the inorganic solid and then separating an organic rich phase for reuse, the separation of the organic rich phase involving heating the liquid mixture from which the inorganic solid has been removed.

---

This invention relates to a process for recovering a soluble mineral or salt such as KCl from a deposit containing other soluble materials. More particularly, this invention relates to recovery of soluble minerals from brines wherein a solvent, partially miscible with water, causes the precipitation of the desired salt.

In solution mining of salts of group I metals higher in atomic number than sodium, mainly potassium chloride, conventional practice requires the evaporation of large quantities of water in order to precipitate the maximum yield of valuable salts. Sodium chloride, of relatively little value, is always a major constituent of the brine, and it is necessary to obtain a product substantially free of it.

If the "deposit" to be mined is already in the form of brine, then the sodium chloride portion of the brine can be discarded as waste brine. If the deposit is solid, e.g. as sylvinate, the double salt of potassium chloride (KCl) and sodium chloride (NaCl), then it will usually be preferred, especially where the fresh water supply is minimal, to recycle brine after partial removal of KCl. Also practiced are partial brine recycle processes for non-selective deposit solution.

The process of this invention can more efficiently achieve either goal, or partial recycle, so that any selected combination of fresh water and brine may be recycled to a deposit.

Basically, the process of this invention requires much lower net heating or cooling requirements than prior art processes because water does not have to be removed as a vapor in order to precipitate the KCl. Rather, a selected organic solvent is added to the KCl-NoCl brine which has the property of forming a loose "complex" with water at low temperatures, such that water of hydration is removed from the potassium ions, causing precipitation of the least soluble potassium salt in the mixture relative to the concentration of ions present, usually potassium chloride.

After the solid phase has been removed, the bulk of the organic solvent may be very simply recovered by heating the mixture, causing the formation of two liquid phases. After cooling by heat exchange with the mixture, the organic phase is again available for precipitation of KCl.

After solvent removal of the relatively small amount of solvent remaining in the brine phase, it may be discarded or recycled to the deposit, as required.

A recently disclosed process uses ammonia as the precipitating solvent and claims a substantial advantage over the conventional process. The ammonia reduces water vaporization required as compared to the prior art. However, it necessitates the recovery of quantities of ammonia as a vapor of the same magnitude as the water vaporization of conventional practice. Because ammonia from aqueous solutions has nearly as high a latent heat of vaporization as water, much of the theoretical advantage is not realized.

In the process of this invention, by far the bulk of the solvent does not require vaporization, but is recovered as a separate liquid phase after heating, mainly by heat exchange. The basic advantages of the ammonia process are therefore greatly increased by the process of this invention.

It is therefore an object of this invention to provide an improved process for the recovery of inorganic substances from solid mixtures thereof as well as from solutions.

A particular object of the invention is the recovery of the salts of group I metals higher in atomic number than sodium.

Still another object of the invention is the recovery of group I metal halides.

Still another object of the invention is the provision of a process which utilizes an organic liquid in the recovery of inorganic materials.

The above and other objects of this invention are accomplished by a process for recovering an inorganic solid from an aqueous solution by adding a water miscible organic liquid and causing the inorganic solid to precipitate or crystallize, then separating the inorganic solid from the resulting liquid-solid mixture and subsequently separating an organic rich phase from the supernatant for reuse, the separation of the organic rich phase involving heating the supernatant from which the organic solvent has been removed.

The process of this invention is particularly applicable to the salts of alkali metals having atomic numbers above sodium; that is, potassium, rubidium and cesium. Although applicable to all the alkali metal salts of these elements, the process of this invention is particularly applicable to the halide salts in which the halide has an atomic number greater than the atomic number of fluorine and to the oxy-acid salts of the halides, boron and sulfur. Thus, the process of this invention is applicable to the recovery of potassium sulfate from its solutions, the recovery of salts of the various boron acids of potassium, cesium and rubidium, including particularly potassium metaborate and potassium borate, and to the recovery of the various bromides and chlorides of the alkali metals, excluding sodium.

The process of this invention is also applicable to the recovery of salts containing sodium borate and sodium bicarbonate.

Referring to the process flow diagram showing a preferred embodiment of this invention, hot makeup NaCl brine (and/or hot water) is injected into the deposit and the return brine from which KCl is separated is nearly saturated with respect to both NaCl and KCl. In the "countercurrent vapor transfer" section, comprising a plurality of stages in which the pressure is successively reduced, vapor is flashed from the return brine and condensed into the makeup brine which is passing countercurrent to the return brine.

This is not only a highly efficient and inexpensive way of transferring heat, but also it does not require heat transfer surface, which would foul with minor traces of salts such as $CaSO_4$. In addition, the cooling produces supersaturation with respect to KCl, producing a portion of the solid product in the form of seeds, for growth in the next step.

Crystal growth is promoted by next adding the organic solvent stream without further cooling of the NaCl-KCl stream. The heat of mixing and the precipitation of KCl itself will somewhat heat the solution, preferably to about 35°–45° C. Since the solubility of KCl increases rapidly with temperature, this will offset to a degree the precipitating effect of the solvent and promote crystal growth rather than further nucleation. Further enhancement of growth may be obtained by introducing the organic at a plurality of points along the flowing KCl brine slurry line. Prefrably, the stream in this line should be moderately slowly moving (but in turbulent flow), and the line sufficiently long to give an appreciable residence time, preferably 1–10 minutes.

Still more preferably, the enlarged, slow moving section of this line is oriented such that the flow is vertically upward. Since the crystals are of substantially greater density than the liquid, they will fall relative to the liquid, thus both increasing their residence time relative to the liquid and increasing the slurry density, thereby further enhancing crystal growth by providing additional crystal surface for "growth" precipitation, as opposed to nucleation.

Next, the slurry mixture is introduced to the flash decanter, a zone of low pressure where the mixture cools by flashing off vapors, preferably to a temperature of 30–40° C., more preferably 33–38° C. Final crystal growth is thus obtained and the KCl product is removed, centrifuged and preferably washed free of organic by water and/or brine, and dried preferably in a rotary dryer. Vapors are condensed preferably by surface exchange with cooling water and the condensate is returned to the organic solvent stream.

The organic-brine liquid is then decanted from the precipitate in the flash-decanter and heated in the second counter-current vapor transfer vessel, by condensation therein of vapors from the cooling organic phase, as described below. After further heating with vapors condensing therein from the stripper, the mixture, having split into two phases, is settled. The organic phase enters the hot end of the vapor transfer vessel in which are a plurality of stages of successively reduced pressure, such that the phase flashes vapors in each stage. These vapors are condensed into the organic-brine mixture, passing countercurrently as stated above.

The brine phase, containing a minor amount of residual solvent, is taken from the settler and partially stripped by steam to remove some solvent, and then upon entering the vapor transfer vessel is simultaneously cooled and further stripped of solvent by flashing. The vapors will usually be equilibrated with the organic phase by passage therethrough so that a minimum of water vapor passes to the organic-brine stream being heated. In this way, since the separation into phases is usually facilitated both by high organic and high salt content, minimum dilution with water is obtained. The remaining brine may then be discarded, or recycled to the deposit, in any proportions.

It should also be noted that steam economy of the process is not reduced by the requirement of high recovery of the solvent since the brine phase may be divided into two (or more) portions, only a single one of which need be stripped with steam, and the other stream(s) can be stripped by contacting on each stage with the flash vapors from the stripped portion in the manner described above. Thus, the steam requirement, in general, will be fixed by the economics of the heat exchange required for phase separation of the organic-brine mixture.

The solvent used in the process has two important properties. It must be more soluble in water at the lower temperature found in the feed streams and flash decanter than it is at the higher temperature found in the settling vessel after the heat transfer step. This is to insure that the solvent is easily recovered.

Further, the solvent should have a greater "affinity" for water than the KCl has, thus in effect, robbing the KCl of water of hydration and causing the precipitation of KCl at a temperature higher and/or a concentration lower than would otherwise be the case. Thus, the solvent has the effect of "salting out" the desired product.

Solvents which may be used in the process of this invention are generally organic bases which ordinarily have a nitrogen atom having a pair of electrons available to complex with water.

It is preferred that the organic base employed have a pH in water solution of from about 8 to about 10.7. In some processes, bases having higher pH can be employed if it is desired to precipitate such compounds as $Mg(OH)_2$ from the aqueous solution.

Preferred bases are those which are heterocyclic and which contain tertiary nitrogen, that is nitrogen bonded only to carbon, with no hydrogen bonded directly to nitrogen. However, in those cases where higher pH can be tolerated, acyclic tertiary amines may be employed.

Ordinarily, because of solubility limitations, heterocyclic compounds having up to 6 carbon atoms are employed in the process of this invention. These may have 4 or 5 carbon atoms in the ring and may also contain oxygen as a ring constituent. Those with six total carbon atoms give better results at lower precipitation temperatures.

It is also preferred that when the compound contains oxygen, the nitrogen is separated from oxygen by two carbons and the oxygen is bonded only to carbons. This preference applies to both the acyclic and heterocyclic compounds used in this invention.

Thus, compounds which may be employed include pyridine, the picolines, morpholines, N-methyl pyrrolidine, e-dimethylamino tetrahydrofuran, N-methyl morpholine, the various methyl, dimethyl and ethyl derivatives of morpholine in which the substituents are on the ring carbon atom, N-ethyl morpholine, and the various methyl derivatives of N-methyl morpholine.

When mixtures of compounds are used, heterocyclics having up to 7 carbon atoms may be employed as constituents of the mixture so long as the average number of carbon atoms per mol of solvent is no greater than about 6.

Among the acyclic tertiary amines which may be employed are those having from about four to no more than about five carbon atoms in the molecule. These include ethyl dimethyl amine, diethyl methyl amine, and dimethyl (2 methoxyethyl) amine. A particularly preferred embodiment of the invention is the use of a solvent mixture wherein the ratio of carbon to nitrogen atoms is not less than about 4.5:1.

The above organic liquids can be used alone or in admixture or they may be combined with dimethyl sulfoxide, sulfolane and methyl sulfolane.

EXAMPLE

One hundred pounds of water containing dissolved therein about 27 pounds of sodium chloride and about 32 pounds of potassium chloride at a temperature of 90° C. is taken through a countercurrent vapor transfer in four stages with a brine containing primarily sodium chloride. The vapor transfer is conducted in an apparatus in which the potassium chloride-containing hot brine is transferred countercurrently with the sodium chloride brine such that the vapors of the two materials are in contact but the liquid phases are separated. The feed stream leaves the countercurrent transfer apparatus at a temperature of about 41° C. and has given up approximately 9 pounds of water vapor to the sodium chloride stream. Of the original 32 pounds of potassium chloride per hundred pounds of water, approximately 19 pounds remain in solution after the countercurrent vapor transfer. The remaining potassium chloride exists as a precipitate in the stream. Thus, the warm feed stream containing both sodium and potassium chloride has been cooled and concentrated by the countercurrent vapor transfer process with the sodium chloride brine which entered the apparatus at a lower temperature. The slurry of potassium chloride in a potassium chloride-sodium chloride brine is then mixed with about 65 pounds of organic solvent which has dissolved therein water and a small amount of sodium chloride. Of the 65 pounds of solvent per hundred pounds of feed water, 50 pounds is a 2 to 1 mixture of pyridine and N-methyl morpholine. There is about 15 pounds of water and one-half pound of sodium chloride in solution in the solvent mixed with the stream. The feed stream rises in a standing pipe of relatively large diameter and has a residence time in the pipe of from 1 to about 10 minutes. It is preferred that the residence time in the stand pipe be approximately 2 minutes. The material is then moved to the flash decanter in which it has a residence time of approximately 10 minutes. In the flash decanter, vapors comprising primarily the solvent are taken off overhead and combined with the solvent stream which is added to the additional feed slurry. In this example, the vapors leaving the flash decanter are approximately two-thirds solvent and approximately one-third water vapor. These are cooled in a condenser by cooling water prior to being mixed with additional solvent.

The steady state temperature in the flash decanter is approximately 35° C. During residence in the stand pipe and the flash decanter, the feed stream is continually losing potassium chloride by precipitation so that only about 6 pounds of the original potassium chloride is still in solution in the material leaving the flash decanter to the second countercurrent vapor transfer section. Approximately 81 percent of the original potassium chloride is taken from the flash decanter as a concentrated slurry. It is then centrifuged and dried to yield the desired product.

In practice, there is a large recirculation line of liquid slurry from the flash decanter to the line entering the flash decanter containing the slurry and solvent. Additionally, any liquid recovered in the centrifugation stage is recirculated to the flash decanter.

Solvent may be recovered from the centrifuge by washing the KCl with water or waste brine. Any solvent remaining on the cake during the drying stage may be recovered by condensation of solvent vapors.

Liquid from the flash decanter, which contains a small amount of potassium chloride, sodium chloride and dissolved solvent, is taken to a countercurrent vapor transfer apparatus wherein it is heated by condensation of hot vapors of solvent and brine which travel through the apparatus in the opposite direcion. As the liquid becomes hotter and hotter, the solubility of solvent becomes lower and lower and the material from the flash decanter leaves the second countercurrent vapor transfer apparatus as a two-phase mixture, one water-rich and one solvent-rich. These are separated in a settling vessel and the brine phase is partialy freed of solvent by steam stripping. The vapors from the stripping apparatus are re-cycled to the settling vessel while the brine phase from the stripping operation enters the second countercurrent vapor transfer apparatus to be cooled and further freed of the last traces of solvent. During this vapor transfer process, the brine also loses heat to the material which was effluent from the flash decanter. Likewise, the organic-rich phase from the settler is conveyed through the second countercurrent vapor transfer apparatus wherein it is cooled. During this cooling, the organic-rich phase loses solvent vapors to the material which was efffluent from the flash decanter along with some water vapor. The brine effluent from the second countercurrent vapor transfer unit can either be discarded from the process or recycled in whole or in part. Recycle is particularly advantageous when the deposit being mined is a solid mixture of sodium chloride and potassium chloride and it is desired to preferentially dissolve the potassium chloride from the deposit.

Although the process of this invention has been described specifically with respect to the recovery of potassium chloride, it is to be understood that, as poinited out above, it has a much wider applicability to the recovery of inorganic compounds from aqueous solutions. Where a water soluble inorganic compound is found in nature in a solid form, it may first be converted to a brine for recovery and purification processing according to the process of this invention. Where the compound is found in naturally occurring brines, it may be directly utilized in the process of this invention.

While particular embodiments of this invention have been shown and described, it is not intended to limit the same to the exact details of the construction set forth and it embraces such changes, modifications and equivalents of the parts and their formation and arrangement as come within the purview of the appended claims.

I claim:
1. A process for the recovery of potassium chloride from a mixture of sodium chloride and potassium chloride, which process comprises adding to an aqueous solution of said salts, a two-to-one mixture of pyridine and N-methyl-morphaline, thereby precipitating said potassium chloride, and separating said precipitated potassium chloride.

2. The process of claim 1 including subsequently separating an organic rich phase from the remaining organic-aqueous mixture by heating said mixture.

References Cited
UNITED STATES PATENTS 3,231,340  1/1966  Gaska _____ 23—300
3,437,451  4/1969  Every _____ 23—300

OTHER REFERENCES

Comey and Hahn: Chemical Solubilities, 2nd Ed. MacMillan Co., New York, 1921, p. 759.

Seidell: Solubilities of Inorg. and Org. Cls., vol. 1, Van Norstrand Co., New York, 2nd Ed., 1919, pp. 523 to 526, 649 and 561.

NORMAN YUDKOFF, Primary Examiner

S. J. EMERY, Assistant Examiner

U.S. Cl. X.R.

23—302, 296; 260—290